April 28, 1936.     A. W. BARBER     2,039,267
ELECTRICAL METER
Filed March 13, 1934     4 Sheets-Sheet 1

Alfred W. Barber
INVENTOR

ATTORNEY

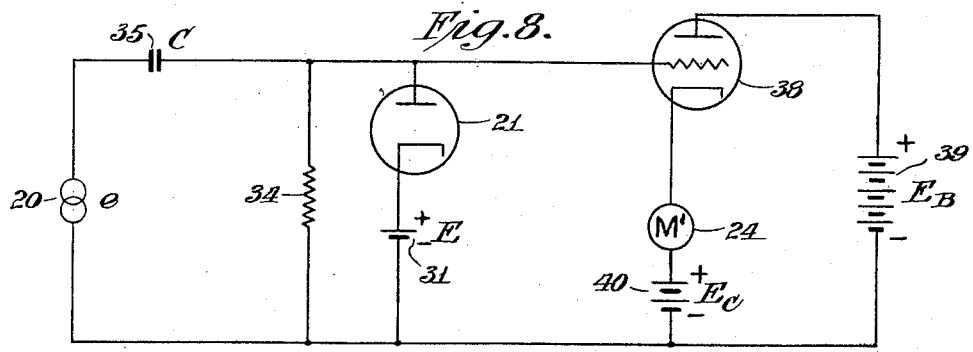
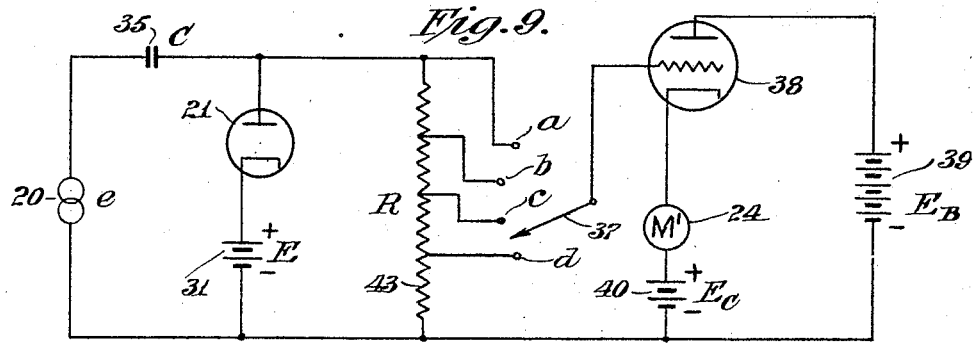
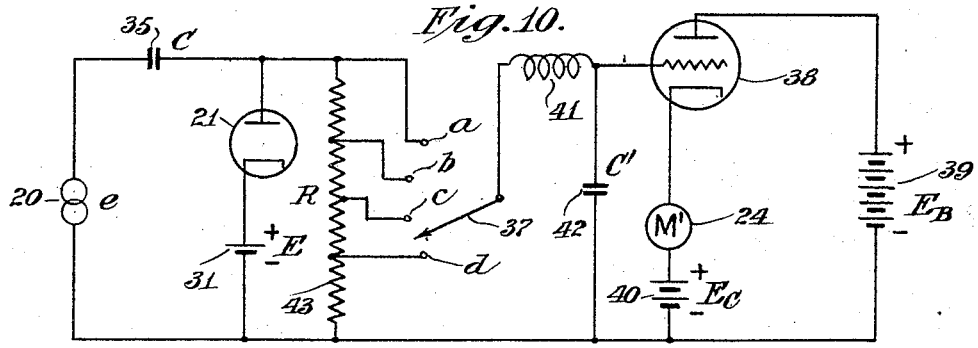
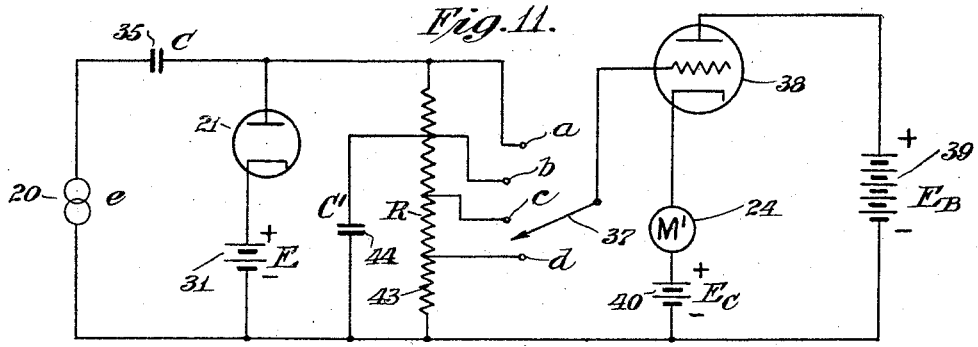

Alfred W. Barber
INVENTOR

ATTORNEY

Patented Apr. 28, 1936

2,039,267

UNITED STATES PATENT OFFICE 2,039,267

ELECTRICAL METER

Alfred W. Barber, Flushing, N. Y., assignor to Premier Crystal Laboratories, Inc., New York, N. Y., a corporation of New York Application March 13, 1934, Serial No. 715,275

12 Claims. (Cl. 171—95)

This invention relates to apparatus and methods for measuring electrical potentials, especially to such as are adapted for the measurement of alternating current potentials.

Such potential measuring devices, hereinafter referred to as A. C. voltmeters, have as hitherto constructed been subject to serious difficulties and limitations. One of these difficulties has been the fact that, in comparison with direct current voltmeters, hereinafter referred to as D. C. voltmeters, the amount of current demanded by the A. C. instrument has been of an order of magnitude considerably greater than that used by the D. C. instrument.

Another difficulty in the operation of A. C. voltmeters has been the fact that it has been virtually impossible to construct such meters which would give accurate readings over a wide range of current frequencies. Still another difficulty encountered in the construction of A. C. voltmeters has been the comparatively narrow range of voltages which could be measured by a single instrument. Many types of such instruments were crowded at the lower end of their indicating scales and the employment of external resistors was often attended with serious error.

This invention overcomes the difficulties above mentioned and provides in a single comparatively simple instrument a voltmeter capable of working over a wide range of frequencies and of covering a wide range of voltage values without serious error and without drawing an undue amount of current from the circuit to be measured.

One object of this invention is to provide a voltmeter which will consume a very minute amount of energy for its satisfactory operation and consequently will not materially alter the current distribution in the circuit to which it is connected or cause a serious change of voltage or phase relationships in such a circuit by reason of presenting a low impedance path for current flow.

Another object of this invention is to permit a single A. C. voltmeter, provided with a single indicating scale, to be used for the accurate measurement of a wide range of voltage values, by the mere adjustment or change of a switch incorporated therein.

A further object of this invention is to provide an A. C. voltmeter which may be connected to circuits of widely varying frequency without demanding any readjustment of the meter due to such variations in frequency and yet without giving rise to any substantial errors in the indication of the voltmeter.

Yet another object of this invention is to provide a self-contained and accurate voltmeter of the so-called vacuum tube type which shall be simple in construction and in operation, shall draw a comparatively small amount of power from the circuit to be measured and shall be suitable for use over a wide range of frequencies and voltages without substantial errors in its indications.

An additional purpose is to reduce the effective input capacity of a voltmeter to a fractional part of the value usual in such instruments, so that it may be connected to resonant circuits without undesirable effects thereupon.

A still further object of this invention is to include in an A. C. voltmeter a common indicating scale which may be employed to indicate not only voltages derived from an external circuit but also certain voltages derived from internal circuits employed for the operation of the voltmeter itself and to allow such alternate uses of a common indicating scale to be secured by the operation of simple switching devices.

The principles involved in this invention and the construction of certain forms of apparatus suitable for carrying out these principles will be apparent from the accompanying drawings and the description thereof, which are illustrative of certain embodiments of this invention.

Fig. 8 shows the circuit of Fig. 6A modified to use a vacuum tube voltmeter.

Fig. 9 shows another method of incorporating a vacuum tube voltmeter as the measuring means in a circuit using a voltage divider.

Fig. 10 shows this alternative method of subdivision of voltage in order to produce a meter capable of measuring a wide range of voltages, combined with a filter protecting the voltmeter tube from A. C.

Fig. 11 shows a modification of the circuit of Fig. 10.

Figure 1:
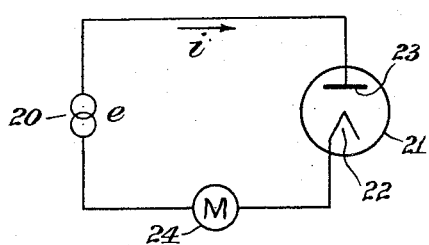
Fig. 1 shows an elementary rectifying and measuring circuit.

Referring now to the drawings in detail, it is advantageous to first briefly explain certain principles involved in this invention. In addition to the reference numerals employed, the customary symbols commonly employed in the electrical art are also shown in many of the drawings as a further aid to their understanding.

Fig. 1 shows a vacuum tube 21 as a simple two electrode device with cathode 22 and anode 23. A voltage source 20 is shown generating an alternating voltage of instantaneous value e. Meter 24 is shown in series with the voltage source and the vacuum tube. If we assume that both the voltage source e and the meter 24 are without resistance, a current i will flow in the direction indicated during the halves of the alternating current wave which will make the diode plate positive with respect to the cathode, and i will have a value $$i = \frac{e}{r}$$

where r is the effective resistance of the diode.

Figure 2:
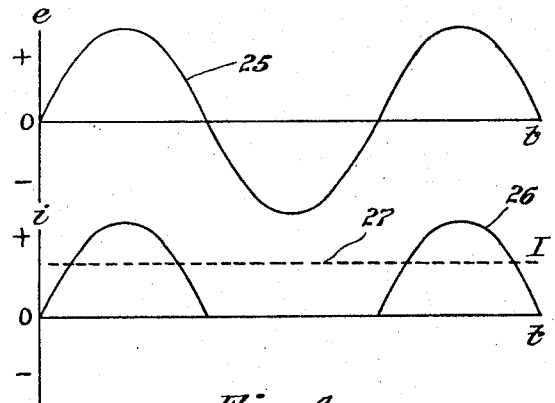
Fig. 2 shows graphs illustrating the action which such a circuit exerts on a supplied A. C. wave form.

If we illustrate by the employment of customary graphs the potential derived from source 20 we will have, in a typical case, a curve of the form illustrated at 25 in Fig. 2. The current due to this potential passing through thermionic rectifier 21 will take a form illustrated by curve 26 in this figure.

There is also shown by curve 27 a value I which is the average value of i and hence meter M being a D. C. meter, will indicate I. It will now be evident that during half of the alternating current cycle the diode is essentially an infinite resistance but during the other half of the cycle it acts like a resistance r. In present day receiving tubes used as diodes r is about 1000 ohms and hence the simple diode rectifier falls within the classification of low impedance devices.

Furthermore the initial velocity of emission of electrons from the cathode and contact potentials within the tube generate a voltage of about 1 volt, in the case of a type 227 tube with no voltage impressed, so that if we try to use the simple diode as a voltmeter we have difficulty with low impressed voltages due to this initial 1 volt in the tube.

Figure 3:
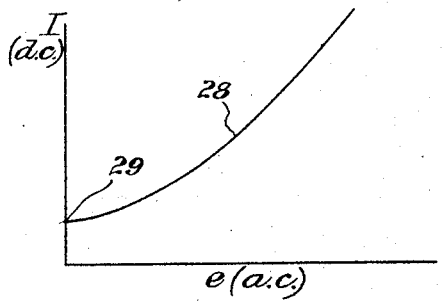
Fig. 3 shows the output curve of a device with a circuit such as that shown in Fig. 1.

Due to the difficulties just mentioned a simple circuit of the type of Fig. 1 is subject to certain errors and in order to illustrate some of these errors I have in Fig. 3 shown a characteristic graph where the D. C. output current, indicated by the line 28, is plotted against the impressed A. C. voltage. Such a graph is produced by a type 27 tube having its grid and plate connected together so that it functions as a diode. In this case the point 29 shows that substantial current flows even when no signal is impressed on the system and therefore shows that the readings of such a device will be erroneous.

Figure 15:
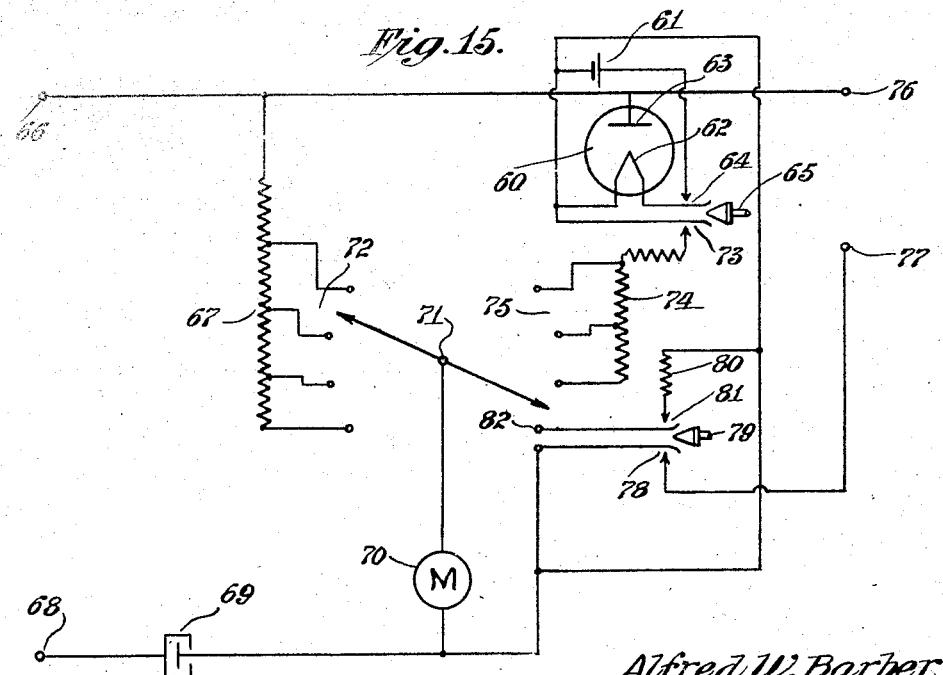
Fig. 15 shows another form of complete meter adapted for battery operation.
Figure 14:
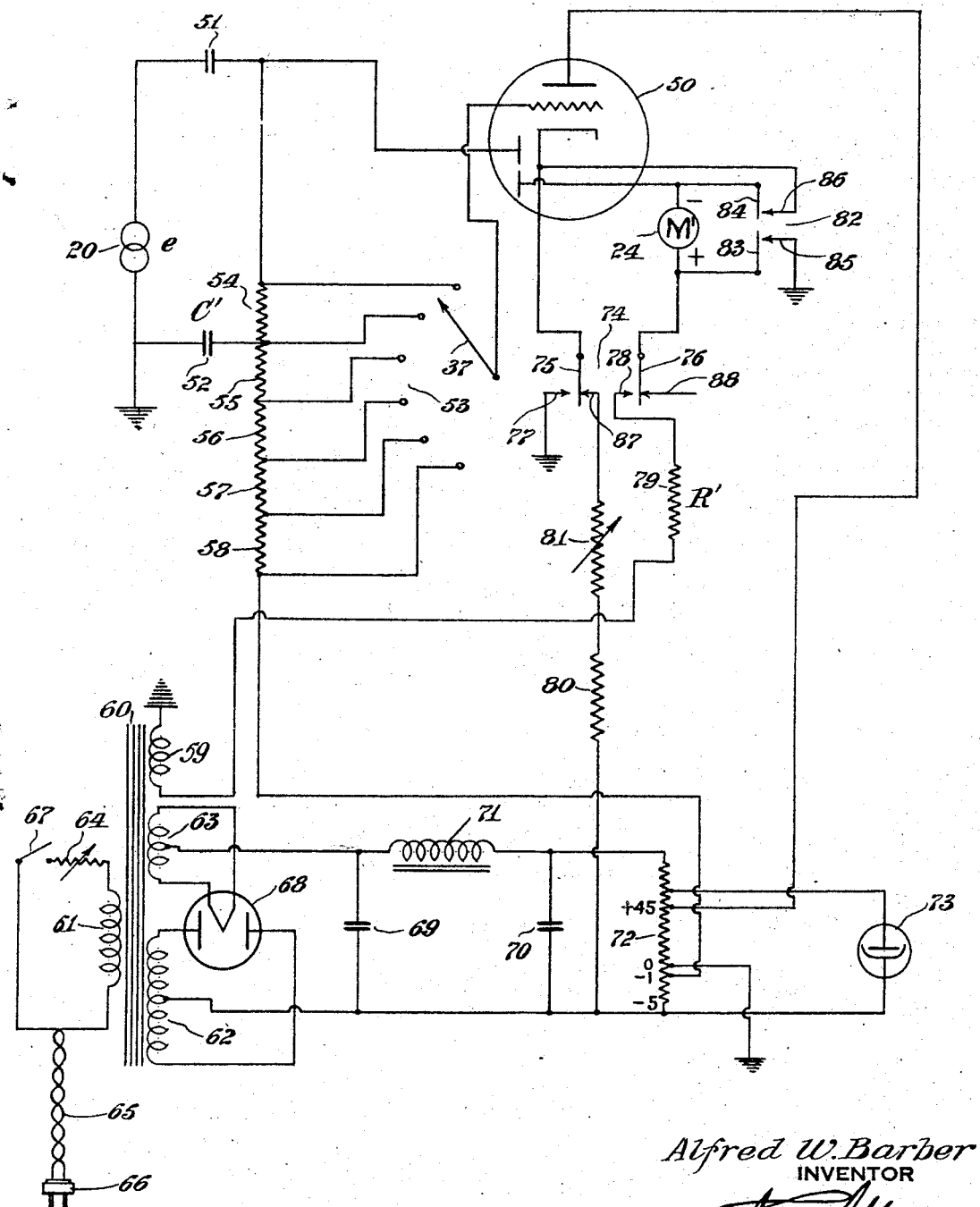
Fig. 14 shows schematically the essential elements and circuits of a complete self-contained voltmeter according to this invention.

As one means of compensating for the errors just illustrated by Fig. 3, the circuit shown in Fig. 4 may be used where, in order to increase the diode impedance, a series resistance 30 is used and in order to make the characteristic more linear a source of bias voltage 31 is used to reduce the initial current substantially to zero, and condenser 32 acts as hereinafter described. It will be apparent that other equivalent corrective methods may be employed to secure a similar corrective effect and such methods are illustrated in Figs. 14 and 15, hereinafter described.

Figure 4:
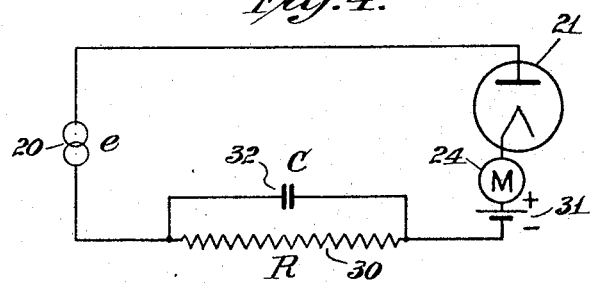
Fig. 4 shows the use of additional corrective means applied to the circuit of Fig. 1.

In Fig. 4, as in the case of the simple diode, the tube acts like an infinite resistance for the negative parts of the input voltage cycle and like a resistance of about 1000 ohms during the positive parts of the cycle. The current which flows during the positive parts of the cycle goes to charge condenser 32 but during the negative parts of the cycle the tube offers an infinite impedance and the condenser 32 discharges across resistor 30. If resistor 30 is considerably greater than r the condenser will be charged more easily than it is discharged and after a few cycles will have a net charge which will act as a bias on the tube in such a direction as to prevent flow of current due to the input A. C. until the bias is exceeded, i. e., the device will draw current only on the peaks of the positive part of the A. C. wave. While the diode is still a 1000 ohm resistance to these peaks, the time during which current is being drawn is so small, the average resistance of the device becomes very high. When resistance 30 is large compared to 1000 ohms I have found that the apparent resistance of the diode r equals or approaches very nearly to the resistance value of element 30. The voltage due to 31 is to neutralize contact E. M. F. and initial velocity of emission.

Figure 5:
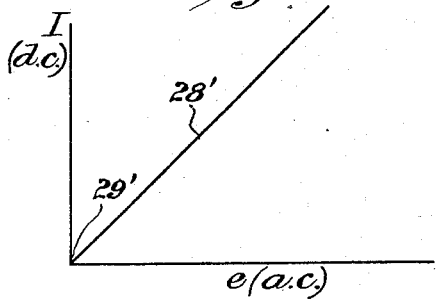
Fig. 5 shows the output graph of a device with a circuit such as that shown in Fig. 4.

Fig. 5 shows a response characteristic curve 28′, whose linearity and passage through the zero point 29′ illustrates the improvement secured by my corrective devices, when compared with the curve of Fig. 3.

Figure 6:
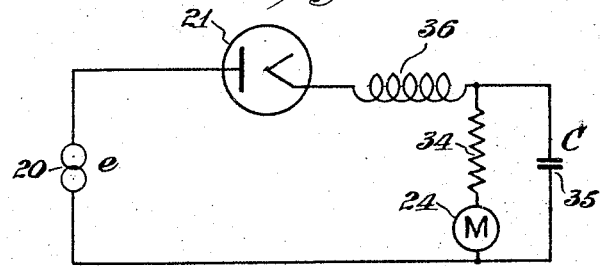
Figs. 6 and 6A show two other alternative arrangements of the circuit of Fig. 4, illustrating further developments thereof.

Fig. 6 shows a choke coil 36 connected in series with the input, to increase the impedance of the device and also shows meter 24 connected so that only the current flowing through the resistor passes through it. This form of connection, while increasing the input resistance, yet lowers the meter reading but I have found it of use in certain cases, where high impedance is wanted.

Figure 6A:
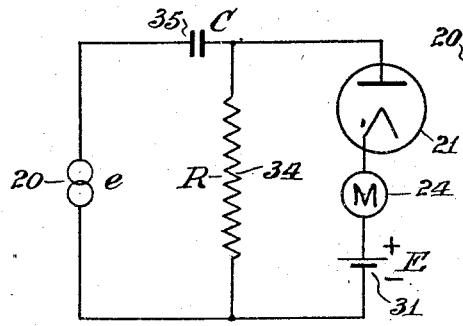

Fig. 6A illustrates another modification of the circuit of Fig. 4. In this case the discharge resistance 34 and its associated condenser 35 are connected in series with voltage source 20 while the rectifying tube 21, indicating ammeter 24 and bias battery 31 are all connected in series and the combination is shunted across discharge resistor 34. In this case, the impedance of condenser 35 may be considered negligible and since resistance 34 is approximately equalled by the resistance of tube 21, then the input impedance of the combination will be substantially one-half that of the circuit shown in Fig. 4, for an equal value of resistance 30.

In the circuits thus far illustrated, the actual indicating meter is really a current measuring device and is preferably chosen to use as little current as possible, in order to draw as little current as possible from the circuit to which the assembly is connected. This limits the range of measurements to the minimum and maximum values which this meter can conveniently indicate.

Figure 7:
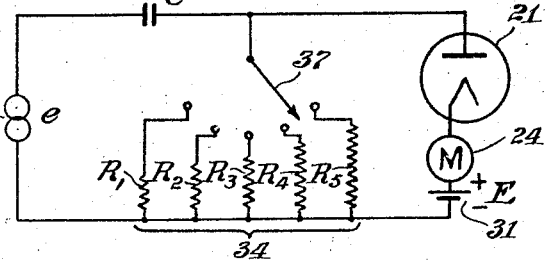
Fig. 7 shows a simple circuit adapted to cover a wide range of measurement values.

Fig. 7 illustrates a circuit where the range of values covered by the meter may be widely extended, without resort to the expedient of using shunts in parallel to the ammeter 24. This latter use of shunts would demand the withdrawal of greater current from the circuit to be measured, as the voltages in the circuit increased, thus rapidly and greatly increasing the power consumption of the meter, which latter is undesirable in practice.

In the case of Fig. 7, resistance 34 is alternatively chosen from a plurality of resistances marked $R_1$ $R_2$ etc., by an appropriate setting of switch 37. Since the current through meter 24 is a function not only of the impressed voltage, but also of the resistance in the circuit, it is evident that varying the value of the latter according to the voltage to be measured will allow the current withdrawn from the circuit to be measured, and consequently the current flowing through meter 24, to be kept within certain limits, over a wide range of impressed voltages.

Fig. 8 illustrates still another method of measuring the voltage developed across resistance 34 by shunting across it the input circuit of a second triode 38 or other convenient type of vacuum tube, which latter tube may have its output current measured and thus becomes per se somewhat the equivalent of a conventional vacuum tube voltmeter. In this case the meter 24 is placed in the anode circuit of tube 38, the potential for energizing this anode being derived from a suitable battery 39, and a suitable bias being supplied to the grid of tube 38 by means of battery 40. As a basis for this development, I have chosen the circuit of Fig. 6A because it may be employed even though source 20 does not furnish a metallic path. In the case of this circuit no choke coil is used and consequently tube 38 has A. C. as well as D. C. applied to its grid.

Fig. 9 shows how the individual resistors illustrated at 34 in Fig. 7 may be replaced by a single tapped resistor 43 connected to switch points $a$, $b$, $c$, etc. Switch 37 affords alternative connection to the various switch points, which may be as numerous as the range of values needed may demand.

In this case the rectifying tube 21 is subject to virtually the entire incoming voltage since the impedance of condenser 35 may be made of a negligible value for the frequencies being measured. The rectified output of tube 21 appears across the extreme terminal points of resistance 43 and switch 37 acts to connect a vacuum tube voltmeter across various sections of this resistance. This voltmeter is indicated as being of the same type as that in Fig. 8 but may be of any other suitable type.

Fig. 10 shows a further refinement of the circuit of Fig. 9, where choke coil 41 and bypass condenser 42 are employed to keep A. C. from the grid of tube 38, while yet allowing it to function satisfactorily with respect to its D. C. input. The function of choke coil 41 is similar to that of the ordinary choke coil used in filter circuits, while condenser 42 serves to bypass any A. C. which may come through choke coil 41 and accordingly should be of a value suitable for this purpose.

Fig. 11 illustrates a modification of the circuit of Fig. 10, where choke coil 41 is eliminated and in place of bypass condenser 32 directly across the input of the vacuum tube voltmeter, there is substituted another bypass condenser 44 connected between one terminal of resistance 43 and some intermediate tap of this resistance, such as $b$.

The choke coil which is eliminated by the use of this circuit tends to introduce frequency limitations, since the impedance of such a choke coil can usually only be kept sufficiently high over a certain band of frequencies. While it might be possible by the employment of a plurality of choke coils designed to respond to different bands of frequencies, to secure a wide frequency coverage, I have found it preferable to eliminate this choke coil. With the circuit of Fig. 11 I prefer to make the portion of resistance 43 lying between taps $a$ and $b$ one-half of the total resistance of element 43.

It is true that the shunting effect of the resistor 43 to the applied A. C. is reduced one-half by this mode of connection, but on the other hand the A. C. is eliminated from the input to tube 38, except when switch 37 is placed so as to connect to tap $a$. I have found that the attenuator arrangement of Fig. 11 gives D. C. multiplication and hence has a great advantage over an A. C. attenuator in the input to the diode where the attenuation ratios would be in error for high frequencies due to the diode and voltmeter input capacities across the attenuator.

I have found that one convenient method of compensating for various slight errors that may appear when widely different voltages are applied to my meter, is to alter the actual values of the various sections of resistance 43 so that they depart from the theoretical values in such degree and direction as to minimize any errors. This is a very convenient method and allows a single direct reading scale to be employed for reading various voltage ranges.

Figure 12:
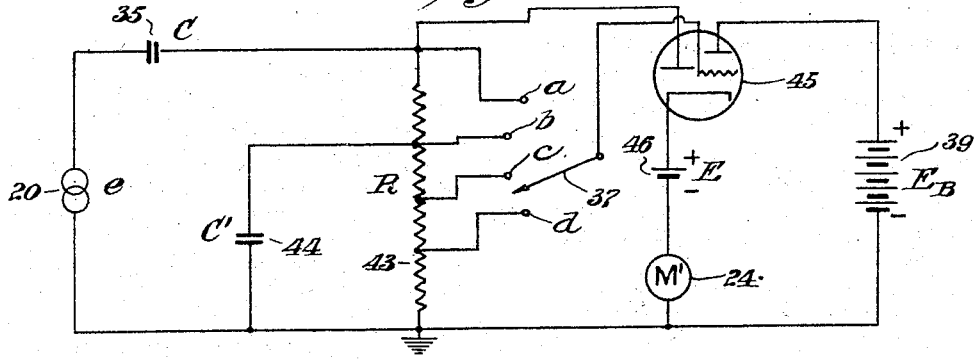
Fig. 12 shows a circuit wherein a single polyfunctional tube replaces a number of separate tubes.

Referring now to Fig. 12, there is here illustrated a single polyfunctional tube 45, replacing separate tubes 21 and 38 of Fig. 11. Tube 45 is illustrated as of the type commonly referred to as —55, but any other suitable polyfunctional tube may be employed by making changes in the circuit constants and voltages applied, as may be indicated by such tube substitution and as will be apparent to those skilled in the art. In the case of this figure the other essential parts of the circuit correspond to similarly connected parts in Fig. 11 and bear corresponding reference numerals. To simplify the circuit the cathode heater is not shown since it plays no direct part with respect to the operation of my meter.

It will be apparent that the bias battery indicated at 46 fulfills a dual role, combining the functions of batteries 31 and 40 of Fig. 11. It is desirable that the values required for these two respective batteries be made identical in order that they may be satisfactorily replaced by a single battery. Such an equalization of values may be secured, inter alia, by altering the potential of anode battery 39 in a manner known to the art.

Figure 13:
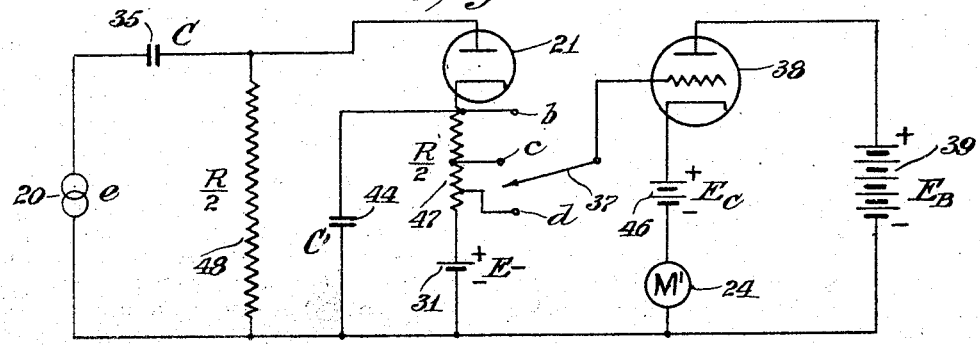
Fig. 13 illustrates an alternative arrangement of the voltage dividing resistors.

Fig. 13 illustrates the employment of two separate tubes for the sake of clarity, but is intended primarily to illustrate an alternative arrangement of discharge resistors 47 and 48. These two resistors are in series with one another and, as a whole, are connected in shunt with rectifying tube 21. The input voltage to be measured is, however, applied across resistor 48 only. This causes the impedance presented by resistor 48 to be in parallel with the impedance presented by resistor 47 plus that presented by tube 21.

It is to be noted that the fall of potential along resistor 47 is, in this case, in the reverse direction from that along resistor 43 of Fig. 12. This affords a convenient means of making the D. C. voltage applied to tube 38 more positive as the D. C. voltage input increases. This direction of voltage change is often advantageous in the use of a vacuum tube voltmeter.

I have found it convenient to make the total resistance of element 47 equal to that of 48 and to shunt element 47 with bypass condenser 44 whose function corresponds with the correspondingly designated condenser in Fig. 11. With the circuit of Fig. 13 the use of tap a is eliminated and the bypassing of the A. C. component of the rectified signal takes place at any position assumed by switch 37.

Referring now to Fig. 14 a —55 type tube is shown at 50. The input voltage source 20 is connected through condenser 51 to one electrode of the tube and by being grounded is afforded connection to the discharge resistor. The bypass condenser 52 is connected across part of the discharge resistor since one terminal of each is in effect grounded. The discharge resistor shown is provided with several sections indicated at 54, 55, 56, 57 and 58. These sections are connected in series with one another and taps are brought out from the points of connection. Switch 37 allows the grid input of tube 50 to be connected alternatively to the various taps of the resistor. The other input point of tube 50 is connected to the same side of condenser 51 to which the resistor is connected. Tube 50 is provided with a cathode heater, but this element is omitted from the drawings for the sake of simplicity, since its use and connection is well known, and since it plays no part in the direct functioning of the apparatus other than merely supplying heat to the cathode of tube 50.

59 shows one possible source of energy for this heater. Such a source may be another secondary winding incorporated in the structure of the transformer indicated at 60. The heater (not shown) is understood to be connected between the ground and the upper end of winding 59, although its circuit is omitted to simplify the diagram.

Transformer 60 is of a type well known in the electrical art and is provided with a single primary winding 61, and a plurality of secondary windings of which some are indicated at 62 and 63. As just mentioned, other windings may be included in the structure of this transformer for heating purposes and the like. Transformer 60 may be connected in series with a variable resistor indicated at 64. This resistor may be either of the automatic or manual control type and serves to keep the input voltage of transformer 60 constant when fluctuations occur in the commercial power source to which this transformer may be connected by means of cord 65 and plug 66. A switch 67 may also be conveniently connected in series with the primary winding of this transformer and by a single operation serve to energize or disconnect the entire assembly. Secondary winding 62 is connected to a rectifying tube 68 preferably of the full wave type, such as the —80 type.

The cathode of this tube may be warmed by connection to winding 63 and the rectified output of the tube fed through an appropriate filter circuit including capacities 69 and 70 and choke coil 71 to a voltage dividing resistor 72. I have found it expedient to use shunted across a portion of this voltage dividing resistor, tube 73 of the so-called voltage regulating type as well known in the art.

This tube may contain an ionizable gas breaking down at a predetermined voltage value and serves to aid in maintaining the D. C. voltage output obtained from resistor 72 at a constant value. I have indicated at various points of voltage dividing resistor 72 taps from which leads are taken to the measuring portion of the apparatus. Typical voltage values are marked at these points of tapping, but such values will necessarily vary in accordance with other constants of the apparatus employed and accordingly I am not confined to these particular values.

I have found it advantageous to be able to directly read upon indicating meter 24 the voltage impressed upon the heater of tube 50. Accordingly a push button 74 of the double contact variety is provided. When this push button is depressed so that movable elements 75 and 76 are placed so as to contact the fixed connections 77 and 78, the circuit which serves to actuate the heater of tube 50 is connected through a fixed resistance 79 to the vacuum tube voltmeter, so that indicating meter 24 will show the voltage impressed upon the heater of tube 50. This reading may likewise be readily used to determine changes of voltage in the power supply connected to transformer 60, since such voltage changes will be reflected in similar changes of heater voltage, owing to the fact that winding 59 derives its energy from the same power circuit as does transformer 60.

I have provided a fixed resistance 80 and a variable resistance 81 in series with it for neutralizing or "bucking out" the steady current flowing through meter 24 when no voltage is supplied from source 20. The use of such "bucking out" arrangements is well known in the art and a detailed description is not considered necessary.

With such a mode of connection meter 24 is enabled to have the zero point of its scale correspond with zero flow of current through the meter. A double push button 82 is provided having two movable contacts 83 and 84, connecting respectively with fixed contacts 85 and 86. The depression of this button allows the voltage from source 20 to be measured upon indicating meter 24. It is understood that push button 74 is arranged so as to normally have movable contacts 75 and 76 in connection with fixed contacts 87 and 88, since this push button has for its sole function the affordance of a ready means for measuring the heater voltage supplied to tube 50. The operation of the various elements of Fig. 14, other than those just described in detail, will be evident to one skilled in the art, since they include the principles illustrated by Figs. 1 to 13.

The following values given for certain of the elements in Fig. 14 are merely illustrative and it is to be understood that such values may be considerably changed in accordance with principles well known in the art, without thereby departing from the spirit of my invention.

Input condenser 51 may be 0.01 mmfd. and input condenser 52 may be 0.1 mmfd. Resistance 54 may be 12 megohms, resistance 55 2.5 megohms, resistance 56 350,000 ohms, resistance 57 100,000 ohms and resistance 58 50,000 ohms. These values are chosen in accordance with the principles previously outlined in connection with Fig. 11, so that a single scale may be employed on meter 24 for directly reading a wide range of voltages.

Resistance 79 may be about 7,000 ohms and resistance 80 about 1,000 ohms, while resistance 81 may be variable from zero to 1,000 ohms.

Voltage dividing resistor 72 may be 10,000 ohms. The voltages delivered by transformer 60 to tube 68 and the values of capacities and the choke coil in the filter system connected to tube 68 are suitably chosen to accord with the type of tube employed as a rectifier and suitable values for these elements will be readily apparent to one skilled in the art. Voltage regulator tube 73 may be of the type commonly referred to as number 874 and in such case will be connected to a point upon resistance 72, which will apply approximately 90 volts to its terminals.

Referring now to Fig. 15, there is here shown a simple battery operated meter arranged to read either A. C. or D. C. on a common scale. Such a meter may be simply made and have an accuracy within 1% which is sufficient for many purposes. The circuit here shown is a development of that shown in Fig. 7 but with a slightly different voltage selecting system.

In this figure, 60 is a battery type tube, preferably of the type demanding low energy for cathode heating. Battery 61 supplies energy for the cathode 62 of this tube, and anode 63 of the tube, while shown as a single element, may comprise the grid and anode of a suitable type of tube connected in parallel with one another, so as to function as a single element. Switch 64 is closed when button 65 is depressed and serves to complete the filament circuit of tube 60. Terminal 66 is connected to anode 63 and also to one end of resistor 67.

Another input terminal 68 is connected through a suitable condenser 69 to one terminal of indicating meter, 70. The other terminal of this meter secures its connection to resistor 67 through switch 71, which allows the effective value of resistor 67 to be altered as indicated by tap-switch 72. When button 65 is depressed, switch 64 is closed and likewise switch 73, which latter makes connection from the tube cathode to corrective resistor network 74. This network secures its other connection to meter 70 through tap-switch 75. Switch 71 is so arranged that corrective resistor 74 is effectively varied simultaneously with a variation of resistor 67. Thus I am enabled to secure an appropriate value of correction for each range of meter values.

In order to make the device of Fig. 15 adaptable for D. C. measurements, there is provided an additional terminal 76 which connects to the upper end of resistor 67, and an additional terminal 77 which connects to one terminal of meter 70 when switch 78 is closed by the depression of push button 79. It will be seen that under these conditions, push button 65 not being depressed and consequently tube 60 and resistor 74 being electrically inactive, that meter 70 and resistor 67 will be directly connected across D. C. terminals 76 and 77.

With the use of a tube having a directly heated cathode, I have found that the operation of the cathode at a sub-normal temperature will often almost entirely reduce the error, illustrated in Fig. 3, to zero. For example, I may impress only 1.5 volts on the filament of a tube rated at 2.0 volts normal potential.

As meter 70 may read somewhat high when connected through the lowest resistance to a D. C. source I have found it advisable to include an additional resistor 80 in shunt to meter 70 and connected thereto by means of switch 81, which is closed upon depression of push button 79, and by means of a special contact 82 which connects to meter 70 through switch 71, when the latter is in a position for reading low voltages.

It will be noticed that this form of my invention does not employ a corrective bias battery or other source of bias as indicated in the previous forms shown. This omission, which is made for the sake of simplicity and portability, gives rise to certain errors, which are compensated to some extent by the corrective resistors and shunts above described. I have found it advisable when such bias is omitted to return the circuit of the indicating meter to the negative side of cathode 62, as indicated in the drawings.

This form of my invention allows the current meter to be shunted for A. C., when such A. C. voltage would read too high and likewise allows the meter to be shunted for D. C. under reverse conditions. A meter constructed as above described will read A. C. when push button 65 is depressed, and D. C. when push button 79 is depressed. In the operation of such a meter having voltage scales of 5, 20, 50 and 200 volts respectively, I have found that readings within 1% of the usual D. C. readings may be readily obtained by appropriately choosing resistance values for elements 67, 74 and 80.

I have shown in many of the diagrams of circuits illustrating my invention, a condenser in series between the source and the rectifying tube. From the discussion of the theory of operation previously given it can be seen that it is immaterial from the view point of rectification, in which lead from the source this condenser is inserted. However I have found certain practical advantages may be obtained by placing this condenser in whichever lead happens to be nearest ground potential and connecting the higher potential lead directly to the anode of the rectifier. In this fashion the capacity added to the source by the connection thereto of the rectifying meter, may be reduced to a few micro-micro farads. I may, to this same end, choose a rectifying tube whose anode-cathode capacity is extremely small and may for the same reason make connection to the anode thereof without the intermediary of a tube-socket. By regard to the foregoing principles, my meter may be employed to measure voltages of resonant circuits employing relatively low capacities, while at the same time minimizing changes of the resonant periods thereof, when the meter is connected thereunto.

I claim:

1. An electronic tube meter including at least two input terminals and having a capacity between one of said input terminals and ground not materially in excess of the effective input capacity of the electronic tube, characterized by the conductive connection of said input terminal directly to at least one element of said electronic tube and also including a condenser between a second input terminal and at least one other element of said electronic tube.

2. Means for minimizing capacity effects in electronic tube meters having a series condenser in their input circuits which includes a condenser in series with the grounded input lead and conductive low capacity means for connecting the other input lead directly to an electron tube element, whereby the capacity change caused in a circuit to be measured, when said meter is connected thereto, does not materially exceed the effective input capacity of the electronic tube.

3. An electrical meter including an electronic rectifying tube and a current meter in series, means for connecting one point of the source to be measured to the current meter and other conductive means having a low capacity to ground for connecting another point of the source to be measured to the electronic tube, said last-mentioned point of the source being susceptible to connections thereto having a high capacity to ground and said electronic tube having low effective input capacity, whereby said complete meter has an effective input capacity not materially in excess of the effective input capacity of the electronic tube.

4. A high impedance alternating current meter comprising a rectifying element, a direct current meter and an element having a high resistance relative to the resistance of the rectifying element, all connected in a series circuit in the order named, the terminals of said circuit constituting the input terminals of said alternating current meter, and also including a capacity shunting at least said resistance, the effective average resistance of said rectifying element thereby attaining the same order of magnitude as said resistance element.

5. A meter according to claim 4 and also including in series with said rectifying element a source of bias potential, whereby the rectified output thereof is rendered substantially linear.

6. An alternating current meter including a rectifier, a direct current meter and a resistance in series, and also including a capacity having one side only connected to one end of said resistance and means for connecting the electrical source to be measured directly and conductively to the other end of said resistance and directly and conductively to the other side of said capacity, respectively.

7. A high resistance alternating current meter including, all in series connection with one another, a thermionic rectifier rectifying the alternating current, a direct current meter measuring the rectified current, a source of bias potential difference keeping the rectified current output in substantially linear relationship to the alternating current input, a condenser charged by the rectified current, and a source of current to be measured, said condenser also having connected in shunt thereto a relatively high resistance element operative to discharge said condenser and the effective average resistance of said thermionic rectifier being thereby caused to become substantially equivalent in value to said high resistance element.

8. An alternating current meter comprising a capacity and a resistance in a series circuit with one another, so that alternating current flows through said capacity and at least a portion of said resistance, a rectifier connected directly and metallically in shunt with said resistance so that direct current potential difference is established across said resistance and a direct current voltmeter also connected in shunt with at least a portion of said resistance so as to measure the direct current potential difference established across said portion thereof, the input terminals of said alternating current meter comprising those terminals of said capacity and said resistance which are not directly connected with one another in the formation of said series circuit.

9. A device for measuring alternating current with a direct current meter which includes a rectifier and a resistance connected directly and metallically in parallel, means for capacitatively coupling in shunt thereto said current to be measured and means for measuring the direct current potential difference thereby established, across at least part of said resistance.

10. An alternating current meter according to claim 6 and also including an alternating current filter between the direct current voltmeter and the portion of the resistance to which it is connected.

11. A meter according to claim 8 and also including a bypass condenser connected across at least part of the resistance whereby alternating current is bypassed away from the direct current voltmeter.

12. A multi-range alternating current meter including a condenser and a rectifier in series with the current to be measured, a resistance element connected in its entirety in shunt with said rectifier so that direct current voltage is developed across it, a direct current voltmeter and switching means for connecting said voltmeter in shunt with a predetermined fractional portion of said resistance so as to measure the direct current voltage developed across said portion as a predetermined fraction of the total direct current voltage developed across the entire resistance.

ALFRED W. BARBER.